United States Patent
Sparrow et al.

(10) Patent No.: US 10,418,134 B2
(45) Date of Patent: Sep. 17, 2019

(54) TOP NOZZLE AND PRESSURIZED WATER NUCLEAR REACTOR INCLUDING SAME

(71) Applicant: Westinghouse Electric Company LLC, Cranberry Township, PA (US)

(72) Inventors: James A Sparrow, Irmo, SC (US); Greg D Hill, Gaston, SC (US)

(73) Assignee: Westinghouse Electric Company, LLC, Cranberry Township, PA (US)

( * ) Notice: Subject to any disclaimer, the term of this patent is extended or adjusted under 35 U.S.C. 154(b) by 380 days.

(21) Appl. No.: 14/995,563

(22) Filed: Jan. 14, 2016

(65) Prior Publication Data

US 2017/0206985 A1    Jul. 20, 2017

(51) Int. Cl.
*G21C 3/33* (2006.01)
*G21C 1/08* (2006.01)

(52) U.S. Cl.
CPC ............ *G21C 1/086* (2013.01); *G21C 3/3315* (2013.01); *G21C 3/3305* (2013.01); *Y02E 30/32* (2013.01)

(58) Field of Classification Search
CPC ........ G21C 3/3315; G21C 3/331; G21C 3/33; G21C 3/332; G21C 3/34; G21C 3/344; G21C 3/3408; G21C 3/3563; G21C 3/3566; G21C 2003/3432; G21C 3/12; G21C 3/14; B05B 1/265
See application file for complete search history.

(56) References Cited

U.S. PATENT DOCUMENTS

| | | | | | |
|---|---|---|---|---|---|
| 4,224,107 | A | * | 9/1980 | Delafosse | G21C 3/3563 376/442 |
| 5,307,392 | A | * | 4/1994 | Bryan | G21C 3/34 376/439 |
| 5,479,464 | A | * | 12/1995 | DeMario | G21C 3/334 376/364 |
| 6,738,447 | B1 | | 5/2004 | Sparrow et al. | |
| 6,912,264 | B2 | * | 6/2005 | Meier | G21C 3/322 376/434 |
| 8,396,182 | B2 | * | 3/2013 | Smith | G21C 3/3206 376/260 |
| 8,594,269 | B2 | | 11/2013 | Aleshin et al. | |

OTHER PUBLICATIONS

Dye, M., and H. Shah. "Enhanced Westinghouse WWER-1000 Fuel Design for Ukraine Reactors." 2015. (Year: 2015).*
Dye et al. Diversification of the VVER fuel market. Sep. 30, 2015. NEI Magazine online article. (Year: 2015).*
Shipov, et al. "TVSA-12 Fuel Assembly. Thermohydraulic Characteristics of the TVSA-12 with Mixing Grids." (2011). (Year: 2011).*

* cited by examiner

*Primary Examiner* — Lily C Garner
(74) *Attorney, Agent, or Firm* — Eckert Seamans Cherin & Mellott, LLC

(57) ABSTRACT

The present invention provides a top nozzle for use with PWR nuclear reactors and power plants, and in particular, VVER nuclear reactors. The top nozzle includes a plate portion having a peripheral portion; a hub portion spaced from the plate portion; a plurality of support portions extending from the plate portion to the hub portion; and at least one deflector portion extending inwardly from the peripheral portion at an acute angle with respect to the plate portion.

20 Claims, 5 Drawing Sheets

TOP NOZZLE AND PRESSURIZED WATER NUCLEAR REACTOR INCLUDING SAME

BACKGROUND

Field

The disclosed concept pertains generally to nuclear fuel assemblies and more particularly to top nozzles for pressurized water nuclear reactors.

Background Information

In nuclear reactors of the type designed in the former Soviet Union, the reactor core is comprised of a large number of elongated fuel assemblies, each having a plurality of fuel rods held in an organized hexagonal array by a plurality of grids spaced longitudinally along the fuel rods and secured to stainless steel control rod guide thimbles. The stainless steel control rod guide thimbles extend above and below the ends of the fuel rods and are attached to the top and bottom nozzles, respectively. The fuel assemblies are arranged in the reactor vessel with the bottom nozzles resting on a lower core plate. An upper core plate rests on the top nozzles.

The top nozzles in the Soviet design are non-removably fixed to the stainless steel control rod guide thimbles of the fuel assembly. These complex nozzles perform several functions. First, they position the rod control cluster assembly (RCCA) relative to the guide tubes within the core so that the position of the RCCA relative to the upper core plate is fixed. The RCCA positions the control rods, which are inserted into the fuel assembly as a group or cluster.

The Soviet nozzle also dampens the velocity of the control rods using springs to remove energy when the RCCA rods are dropped into the reactor core during an emergency shutdown, commonly known as a "scram." The nozzle also supplies spring loads for supporting the internals. When the upper core plate is lowered onto the nozzles, it compresses the nozzle spring. In addition, the Soviet nozzle is designed to protect the control rods when the fuel assembly is removed from the reactor vessel. Under these conditions, the RCCA is at or below the top edge of the nozzle. Finally, the Soviet design of the top nozzle allows the fuel assembly to be handled when lifted out of the core by transferring the loads through the nozzle.

In a VVER-1000 type Soviet designed reactor, the inventors have discovered problems with loading of fuel assemblies. More specifically, during refueling outages, the bottom nozzles of fuel assemblies being loaded into the reactor core make solid contact with the top nozzles of the fuel assemblies already loaded into the core. These interferences cause the fuel assemblies being loaded to be undesirably prevented from moving past the already loaded fuel assembly. This type of incident uses a significant amount of additional critical path time while loading the core. The result is extensions of outage time during fuel assembly loading that correspond to an increase in costs.

Accordingly, a new top nozzle and pressurized water nuclear reactor including a top nozzle are desired that will assure that engagements between the top nozzle and the bottom nozzle of a fuel assembly being loaded into the reactor core do not result in an undesirable extension of time during a refueling outage.

SUMMARY

These needs and others are met by the disclosed concept in which a number of deflector portions are included in a top nozzle of pressurized water nuclear reactor.

In accordance with one aspect of the disclosed concept, a top nozzle for a pressurized water nuclear reactor is provided. The top nozzle comprises a plate portion having a peripheral portion; a hub portion spaced from the plate portion; a plurality of support portions extending from the plate portion to the hub portion; and at least one deflector portion extending inwardly from the peripheral portion at an acute angle with respect to the plate portion.

As another aspect of the disclosed concept, a pressurized water nuclear reactor comprises a pressure vessel; a plurality of fuel assemblies housed by the pressure vessel, each fuel assembly comprising a bottom nozzle, and a top nozzle comprising a plate portion having a peripheral portion, a hub portion spaced from the plate portion, a plurality of support portions extending from the plate portion to the hub portion, and at least one deflector portion extending inwardly from the peripheral portion at an acute angle with respect to the plate portion; and a plurality of fuel rods disposed intermediate the top nozzle and the bottom nozzle.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 1:
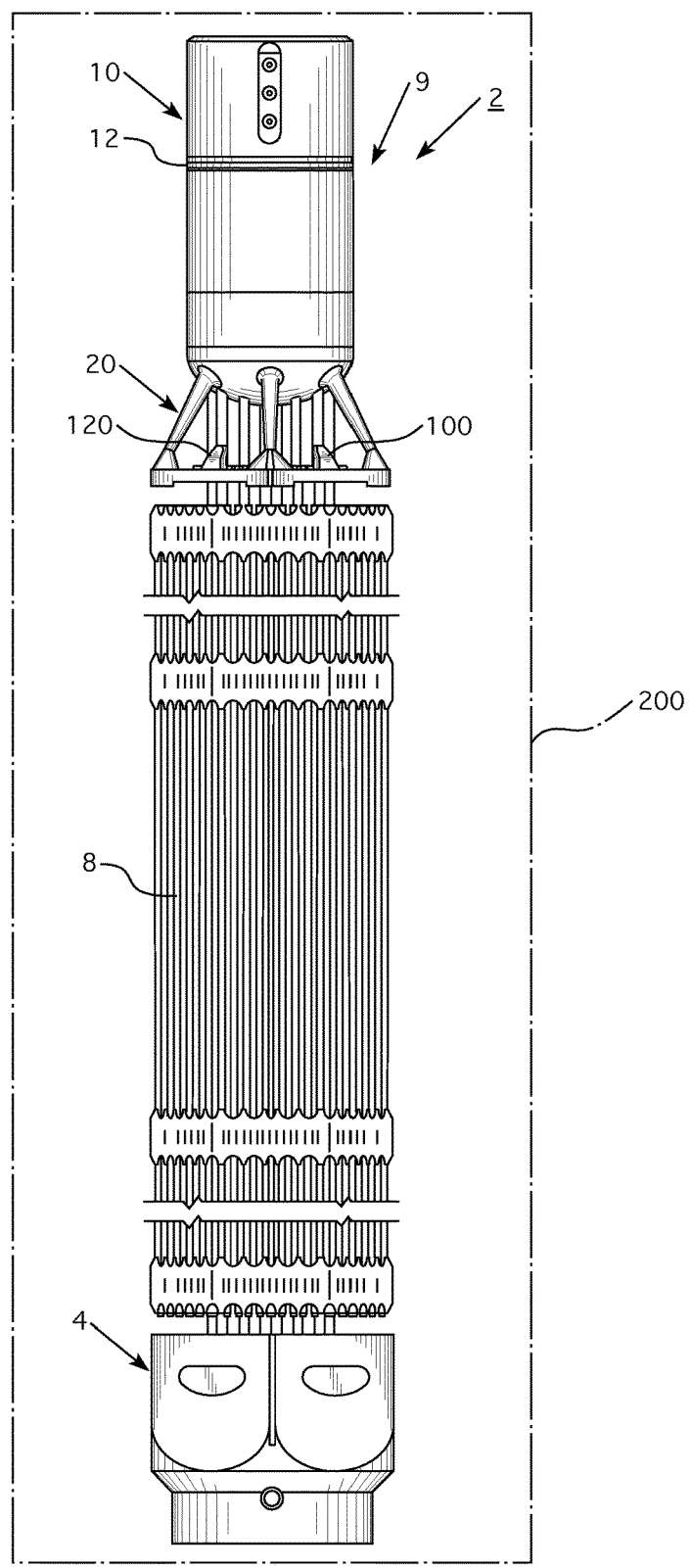
FIG. 1 is a vertical elevation view of a fuel assembly for use with a pressurized water nuclear reactor, in accordance with the disclosed concept.

FIG. 1 shows a fuel assembly 2 for use with a pressurized water nuclear reactor. The fuel assembly 2 is surrounded by a pressure vessel 200 (shown in simplified form in FIG. 1), and includes a bottom nozzle 4, a plurality of fuel rods 8, and a top nozzle assembly 9. The top nozzle assembly 9 includes an upper barrel assembly 10 and a top nozzle 20. The fuel rods 8 are located between the bottom nozzle 4 and the top nozzle 20. The upper barrel assembly 10 includes a plate portion 12, and in operation, an upper core plate (not shown) of the nuclear reactor presses down on the upper barrel assembly 10 and causes the plate portion 12 to compress a number of hold down springs (not shown) located internal the upper barrel assembly 10. This allows the fuel rods 8 to be held in place in the fuel assembly 2.

Figure 2:
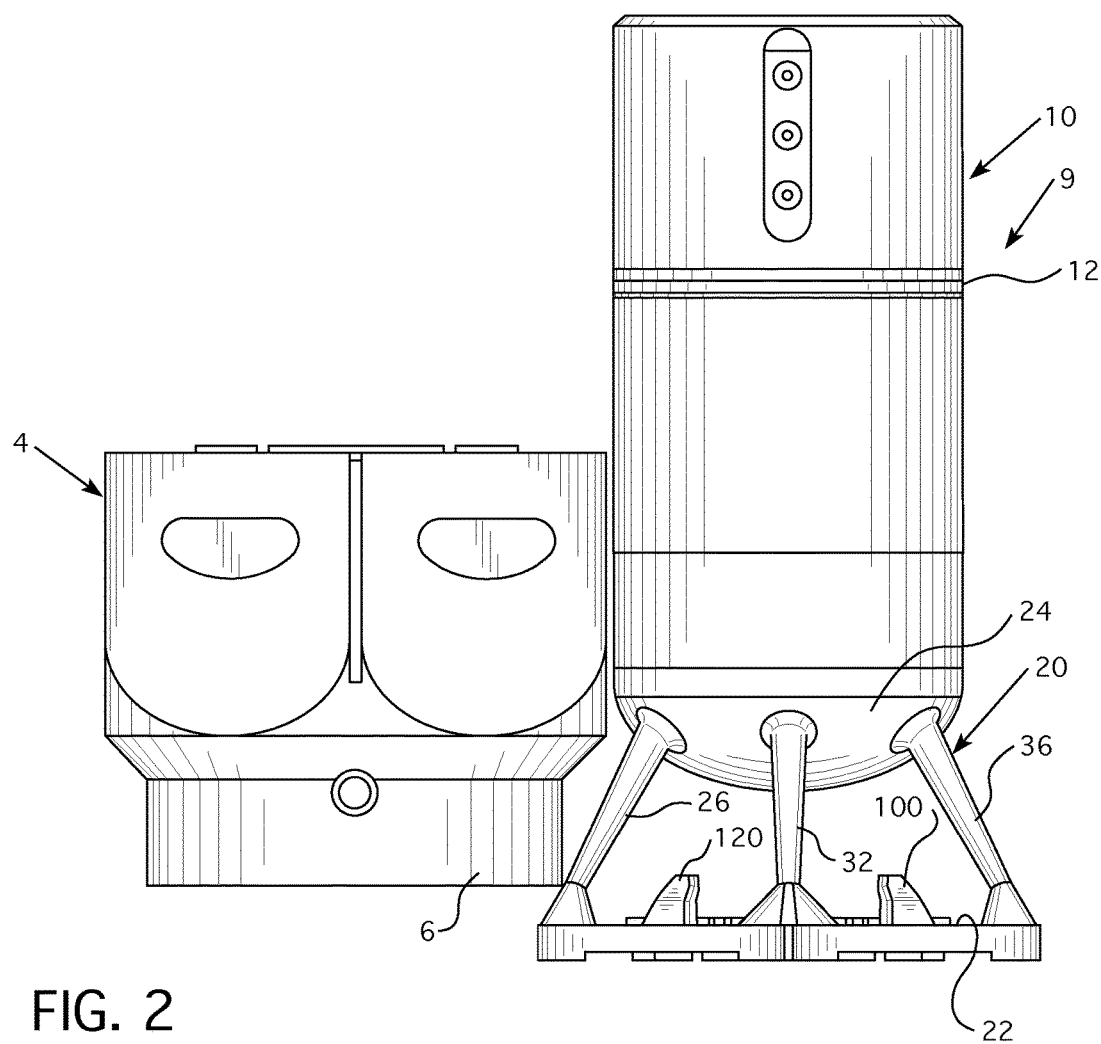
FIG. 2 is a simplified view of portions of the fuel assembly of FIG. 1, shown during loading.

FIG. 2 shows a simplified view of a possible configuration of the bottom nozzle 4 and the top nozzle assembly 9 at an instant in time when the bottom nozzle 4 is being loaded into the fuel assembly 2 (FIG. 1) during a refueling outage. The bottom nozzle 4 has a lower portion 6 that is structured to move past (i.e., down with respect to the orientation of FIG. 2) the top nozzle 20 even in situations where the lower portion 6 engages the top nozzle 20. This is distinct from many known nuclear reactors (not shown) in which interferences, or engagements, between bottom nozzles of fuel assemblies being loaded into the core and top nozzles of fuel assemblies already loaded in the core require additional extensions of outage time to allow the bottom nozzle to move past. As a result, undesirable additional extensions of outage time during refueling outages are avoided, thereby saving time/labor and reducing costs. Additionally, although FIG. 2 shows the lower portion 6 being partially located above a portion of the top nozzle 20 during the illustrated instance in time, it will be appreciated that loading of the bottom nozzle 4 into the fuel assembly 2 (FIG. 1) often results in the bottom nozzle 4 not overlaying the top nozzle 20 during passing, a situation in which there would be no engagement at all between the bottom nozzle 4 and the top nozzle 20.

Figure 3:
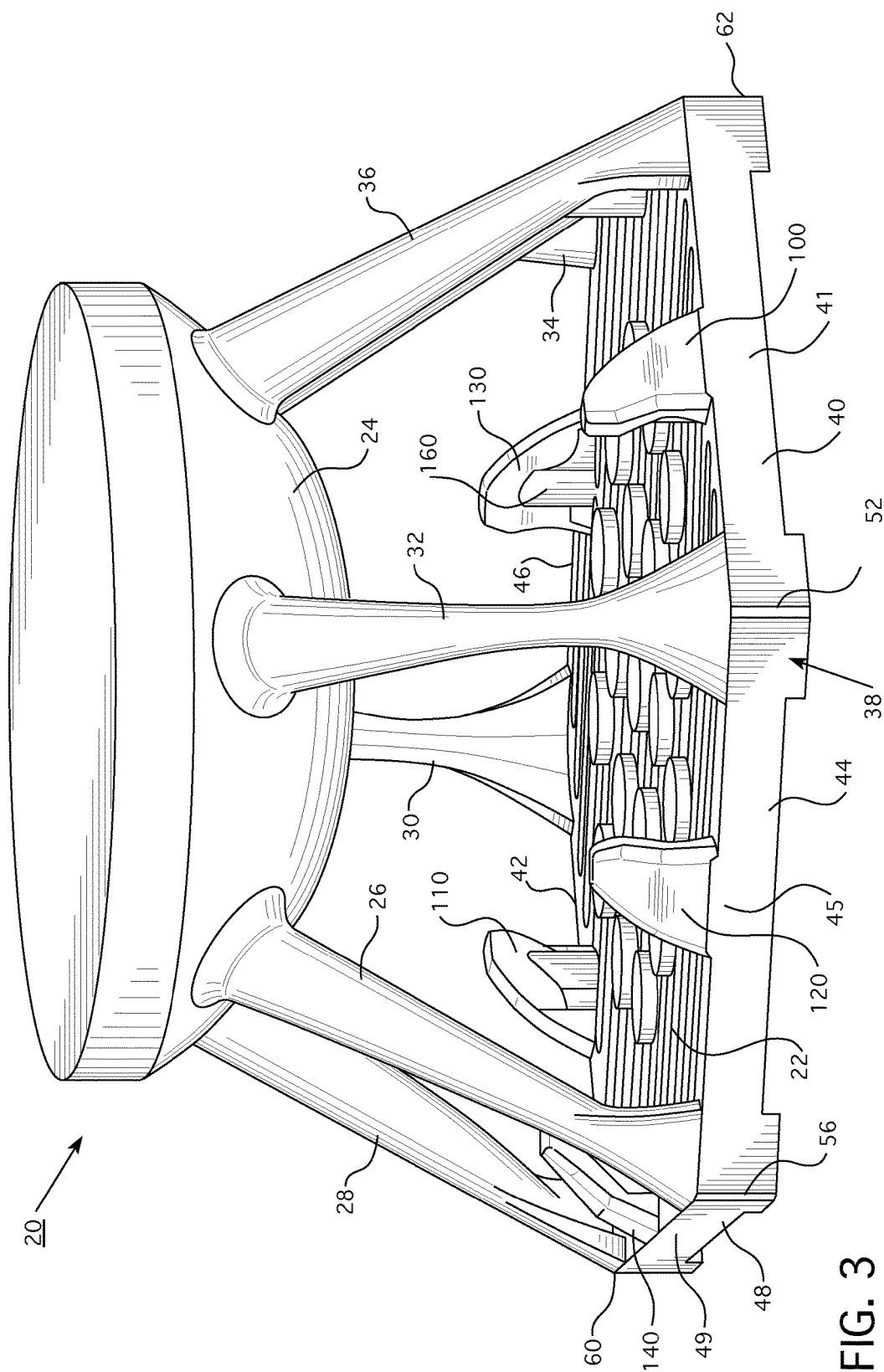
FIG. 3 is a front isometric view of a top nozzle for the fuel assembly of FIG. 1.
Figure 4:
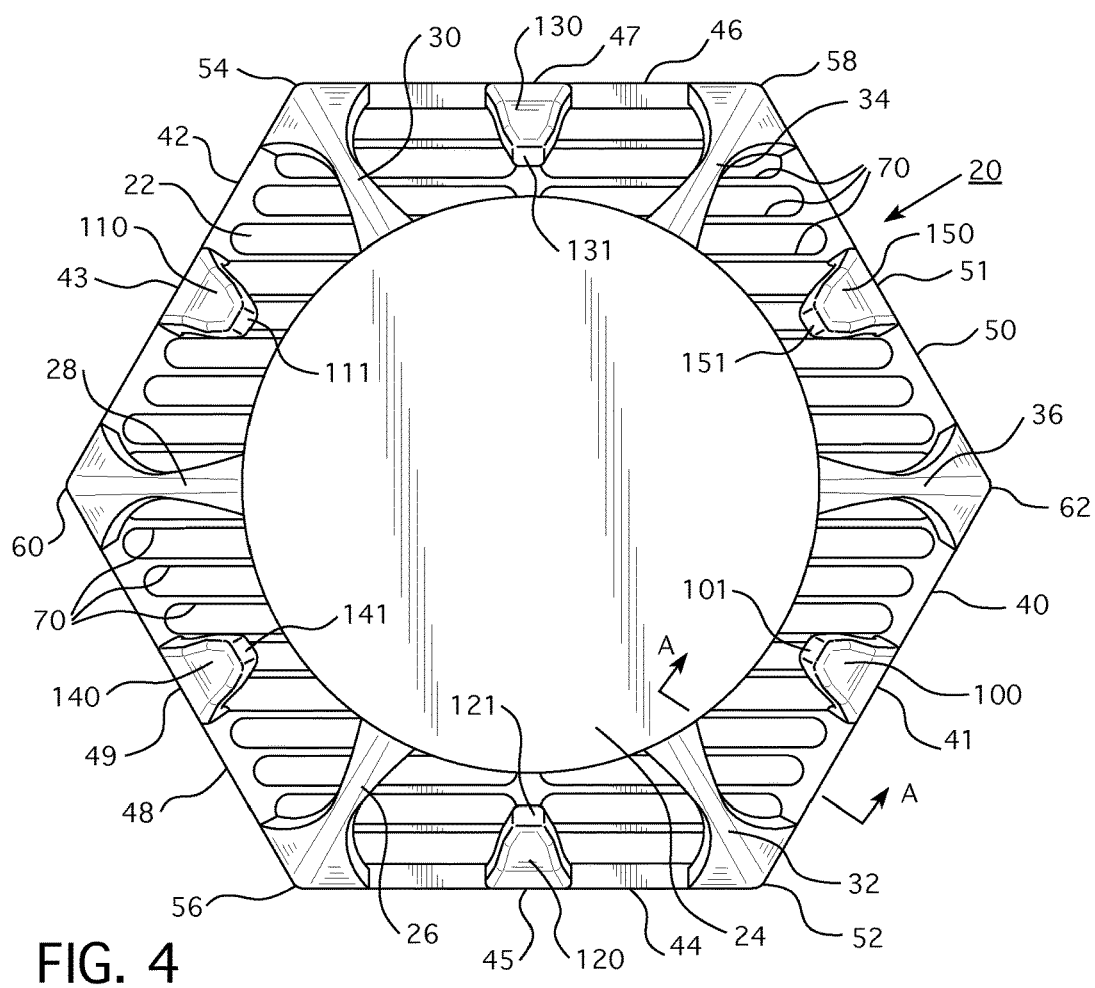
FIG. 4 is top plan view of the top nozzle of FIG. 1.

Referring to FIGS. 3 and 4, the top nozzle 20 includes a hexagonal-shaped plate portion 22, a hub portion 24 spaced from the plate portion 22, and a plurality of support portions 26,28,30,32,34,36 extending from the plate portion 22 to the hub portion 24. The plate portion 22 has a peripheral portion 38 and the top nozzle 20 further includes a number of deflector portions (six deflector portions 100,110,120,130, 140,150 are shown) that each extend radially inwardly from the peripheral portion 38 at an acute angle with respect to an interior of the plate portion 22. During loading of the bottom nozzle 4 (FIGS. 1 and 2) into the fuel assembly 2 (FIG. 1), a potential engagement between the lower portion 6 and the top nozzle 20 would result in the lower portion 6 engaging and exerting a force on one of the deflector portions 100, 110,120,130,140,150. The corresponding opposing normal force on the lower portion 6 by the respective deflector portion 100,110,120, 130,140,150 would cause the bottom nozzle 4 to be deflected left, with respect to the orientation of FIG. 2. Because the peripheral portion 38 is the outermost circumferential portion of the plate portion 22, deflection of the bottom nozzle 4 by the deflector portions 100,110,120, 130, 140,150 would allow the bottom nozzle 4 to continue to be loaded during the refueling outage without requiring an undesirable extension of outage time. In the example of FIG. 2, it will be appreciated that the deflector portion 140 (shown in FIGS. 3 and 4, but hidden in FIG. 2 by the support portion 26) would engage the lower portion 6 during loading of the fuel assembly 2 (FIG. 1) and cause the bottom nozzle 4 to be deflected left.

The peripheral portion 38 has six outer edge portions 40,42,44,46,48,50 that each have a respective midpoint 41,43,45,47,49,51. Each of the deflector portions 100,110, 120,130, 140,150 extends radially inwardly from a corresponding one of the midpoints 41,43,45,47,49,51. The inventors have discovered that midpoints of edge portions of similar top nozzles that do not have deflector portions (not shown) are the locations where interference with bottom nozzles during refueling outages occurs most often. As such, by having the deflector portions 100,110,120,130,140,150 extend from the corresponding midpoints 41,43,45,47,49, 51, in the event of an engagement with the top nozzle 20, the bottom nozzle 4 has a relatively large probability of engaging one of the deflector portions 100,110,120,130,140,150 and being deflected.

Additionally, each of the deflector portions 100,110,120, 130,140,150 is advantageously relatively small. More specifically, as shown in the top plan view of FIG. 4, each of the deflector portions 100,110,120,130,140,150 includes a distal portion 101,111,121, 131,141,151 located opposite and distal the peripheral portion 38, and located between the peripheral portion 38 and the hub portion 24. As seen, each deflector portion 100,110,120,130, 140,150 narrows from the peripheral portion 38 to the respective distal portion 101,111,121,131, 141,151. In this manner, pressure drops associated with fluid flow past the deflector portions 100, 110,120,130,140,150 during operation of the nuclear reactor are advantageously relatively small. Furthermore, the peripheral portion 38 further includes a plurality of corner portions 52,54,56, 58,60,62 from which each of the corresponding support portions 26,28,30,32,34,36 extends. The edge portions 40,42,44,46,48,50 extend between the corner portions 52,54,56,58,60,62, and as shown, the deflector portions 100,110,120,130,140,150 are each spaced from the corner portions 52,54,56,58,60,62. Thus, by being centrally located on each respective edge portion 40,42,44, 46,48,50 and spaced from each of the corner portions 52,54,56,58, 60,62, the relatively small deflector portions 100,110,120, 130,140,150 are not structured to cause significant pressure drops to fluid flowing past the deflector portions 100,110, 120,130,140,150 during operation of the nuclear reactor. It will, however, be appreciated that a similar suitable alternative top nozzle (not shown) could have deflector portions extending from one corner portion entirely to an adjacent corner portion, without departing from the scope of the disclosed concept.

Figure 5:
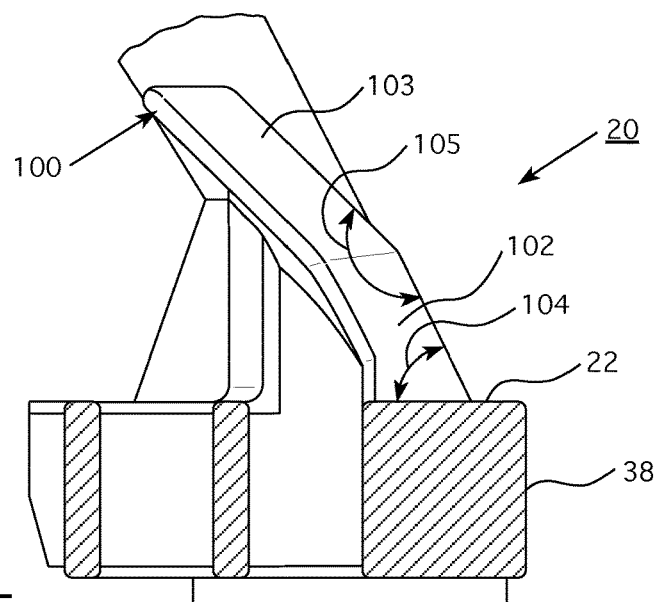
FIG. 5 is a section view of a portion of the top nozzle of FIG. 4, taken along line A-A of FIG. 4.

FIG. 5 shows a section view of a portion of the top nozzle 20. As shown, the deflector portion 100 includes a base portion 102 and an extension portion 103. The base portion 102 extends inwardly from the peripheral portion 38 at an acute angle 104 of between 55 degrees and 75 degrees with respect to the plate portion 22. The extension portion 103 extends inwardly from the base portion 102 at an angle 105 of between 150 degrees and 170 degrees with respect to the base portion 102. By employing the base portion 102 and the extension portion 103, the deflector portion 100 is advantageously able to maintain structural integrity while also extending a relatively large distance over the interior of the plate portion 22, thereby having greater deflection capabilities. More specifically, the extension portion 103 is advantageously able to "catch" the bottom nozzle 4 over a greater range of distances (i.e., distances inward from the peripheral portion 38), as compared to a similar suitable alternative deflector portion (not shown) of equal length as the deflector portion 100, but with a constant inwardly extending angle. It will be appreciated that each of the other deflector portions 110,120,130,140,150 similarly includes a base portion and an extension portion that are angled with respect to each other and the plate portion 22 substantially the same as the base portion 102 and the extension portion 103. However, it is within the scope of the disclosed concept for a top nozzle (not shown) to have deflector portions having relatively constant acute angles (i.e., with a single base portion and no extension portion), without departing from the scope of the disclosed concept.

Figure 6:
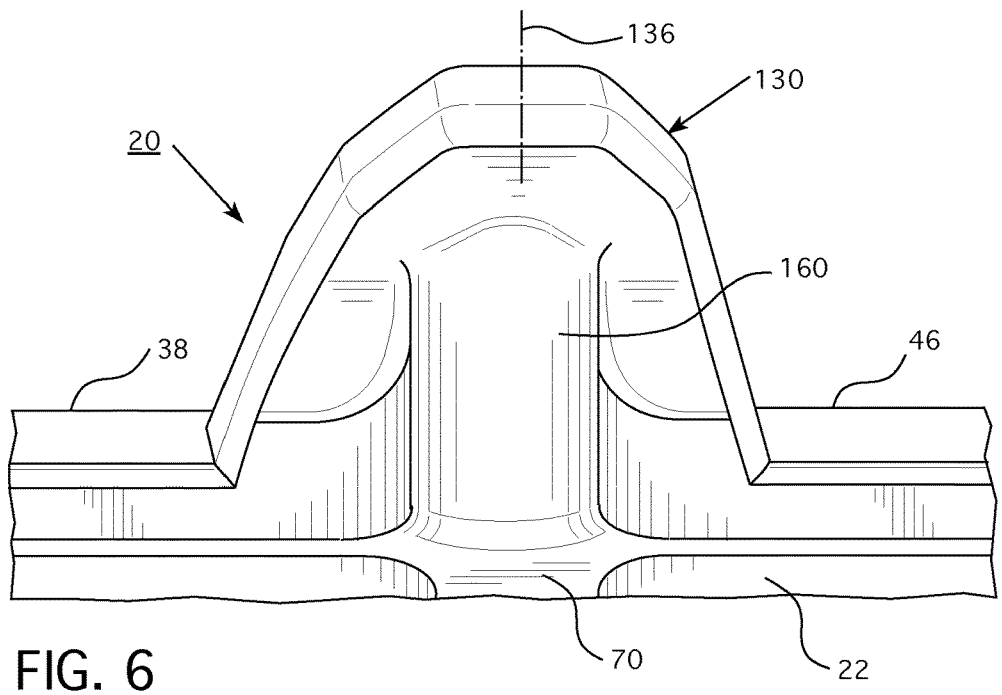
FIG. 6 is a front elevation view of a portion of the top nozzle of FIG. 1.
Figure 7:
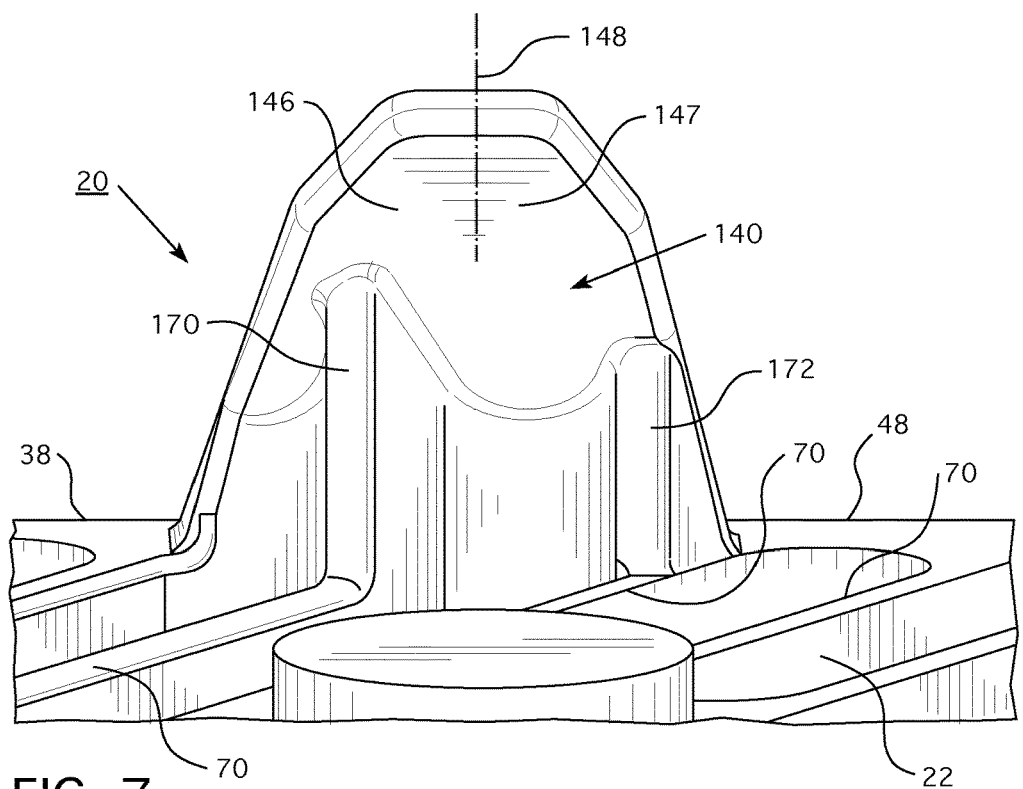
FIG. 7 is a front elevation view of another portion of the top nozzle of FIG. 1.

The top nozzle 20 further includes a plurality of other support portions (one deflector support portion 160 is shown in FIG. 6 and two deflector support portions 170,172 are shown in FIG. 7) that provide structural support to each of the respective deflector portions 100,110,120,130, 140,150 and resist fracture in the event of an engagement with the bottom nozzle 4. The plate portion 22 includes a plurality of ribs 70 extending across the plate portion 22 internal the peripheral portion 38, and each of the deflector support portions 160,170,172 extends from one of the ribs 70 to one of the deflector portions 100,110,120,130,140,150. The deflector support portions 160,170,172 are each perpendicular to a respective one of the ribs 70 from which they extend in order to provide maximum support to the respective deflector portions 100,110,120,130,140,150. In the exemplary embodiment, each of the deflector portions 100,110, 120,130,140,150 generally has one of two configurations, depending on the position of the respective deflector portion 100,110,120,130,140,150 with respect to the ribs 70. The two configurations are depicted in FIGS. 6 and 7, respectively.

As shown in FIG. 6, the deflector portion 130 has a center line 136 coinciding with the deflector support portion 160. That is, the center line 136 and the deflector support portion 160 are each located in a common plane such that the deflector support portion 160 extends from a center of the deflector portion 130. As shown in FIG. 7, the deflector portion 140 has first and second half portions 146,147 and a center line 148 separating the first and second half portions 146,147. The deflector support portions 170,172 extend from a respective one of the first and second half portions 146,147. That is, the deflector support portion 170 substantially extends from the first half portion 146 and does not extend from the second half portion 147, while the deflector support portion 172 substantially extends from the second half portion 147 and does not extend from the first half portion 146.

Referring again to FIG. 4, the deflector portion 120 is situated substantially the same as the opposing deflector portion 130, with respect to the configuration of the ribs 70. Accordingly, it will be appreciated that the top nozzle 20 has another single support portion (not shown) extending from the deflector portion 120 to one of the ribs 70, and coinciding with a corresponding center line of the deflector portion 120. Additionally, the deflector portion 150 is situated substantially the same as the opposing deflector portion 140, and the opposing deflector portions 100,110 are likewise situated substantially the same as the deflector portion 140, with respect to the orientation of the ribs 70. Accordingly, it will be appreciated that the top nozzle 20 further has two additional support portions (partially shown, but not indicated, in FIG. 3) for each of the deflector portions 100,110, 150 that extend from respective first and second half portions of the deflector portions 100,110,150 to a respective one of the ribs 70.

In operation, by having the top nozzle 20 include the deflector portions 100,110, 120,130,140,150, undesirable extensions of outage time during refueling outages as a result of engagements between the bottom nozzle 4 and the top nozzle 20 are significantly minimized and/or avoided. The deflector portions 100,110,120,130,140,150 ensure that the lower portion 6 of the bottom nozzle 4 is able to move past (i.e., down with respect to the orientation of FIG. 2) the top nozzle 20 during loading of the fuel assembly 2 (FIG. 1). More specifically, any potential engagement between the lower portion 6 and the top nozzle 20 during loading of the fuel assembly 2 (FIG. 1) will result in the lower portion 6 engaging a respective one of the deflector portions 100,110, 120,130,140,150. Because of the acute angle (see the angle 104 in FIG. 5) of the deflector portions 100,110,120,130, 140,150 with respect to the interior of the plate portion 22, an engagement, though undesired, would result in a corresponding opposing normal force being exerted on the bottom nozzle 4 to the left. As a result, the bottom nozzle 4 would be deflected (i.e., bumped or moved) left and would thus be able to continue to move down and past the top nozzle 20 and be loaded into the fuel assembly 2 (FIG. 1). This will significantly minimize and/or eliminate additional extensions of outage time during loading of the fuel assembly 2 (FIG. 1) associated with interferences between the bottom nozzle 4 and the top nozzle 20, thereby saving time/labor and reducing costs in connection with refueling outages. Additionally, the top nozzle 20 is preferably made of a single piece of material and can be manufactured by any suitable process known in the art such as, for example, casting. As such, the deflector portions 100,110,120,130, 140,150 can be cast with the top nozzle 20 without requiring any additional assembly.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A top nozzle for a pressurized water nuclear reactor, the top nozzle comprising:
    a horizontal plate portion having a peripheral portion;
    a hub portion spaced from the plate portion;
    a plurality of support portions extending from the plate portion to the hub portion; and
    at least one deflector portion extending continuously inwardly and upwardly from the peripheral portion at an acute angle with respect to the plate portion,
    wherein the at least one deflector portion is spaced from each of the hub portion and the plurality of support portions, and is cantilevered from the peripheral portion,
    wherein the top nozzle is made of a single piece of material, and
    wherein, when the top nozzle is viewed from a top plan view, the at least one deflector portion is substantially triangular shaped.

2. The top nozzle of claim 1 wherein the peripheral portion comprises a plurality of edge portions; and wherein the at least one deflector portion comprises a plurality of deflector portions each extending from one of the plurality of edge portions.

3. The top nozzle of claim 2 wherein each of the plurality of edge portions has a midpoint; and wherein each of the plurality of deflector portions extends radially inwardly from a corresponding midpoint of a corresponding one of the plurality of edge portions.

4. The top nozzle of claim 2 wherein the peripheral portion further comprises a plurality of corner portions; wherein each of the plurality of support portions extends from a corresponding one of the plurality of corner portions; wherein each of the plurality of edge portions extends between a corresponding pair of the plurality of corner portions; and wherein each of the deflector portions is spaced from each of the plurality of corner portions.

5. The top nozzle of claim 2 wherein the plate portion is hexagonal-shaped; wherein the plurality of edge portions comprises six edge portions; and wherein the plurality of deflector portions comprises six deflector portions each extending from a corresponding one of the six edge portions.

6. The top nozzle of claim 1 wherein the at least one deflector portion has a distal portion disposed opposite and distal the peripheral portion; and wherein the at least one deflector portion continuously narrows from the peripheral portion to the distal portion.

7. The top nozzle of claim 1 wherein the plate portion further has a plurality of ribs disposed internal with respect to the peripheral portion; and wherein the top nozzle further comprises at least one deflector support portion extending from a corresponding one of the plurality of ribs to the at least one deflector portion.

8. The top nozzle of claim 7 wherein the at least one deflector support portion is disposed perpendicular to the corresponding one of the plurality of ribs.

9. The top nozzle of claim 7 wherein the at least one deflector portion has a center line coinciding with the at least one deflector support portion.

10. The top nozzle of claim 7 wherein the at least one deflector portion has a first half portion, a second half portion, and a center line separating the first half portion and the second half portion; wherein the at least one deflector support portion comprises a first deflector support portion and a second, separate deflector support portion; wherein the first deflector support portion extends from the first half portion; and wherein the second deflector support portion extends from the second half portion.

11. A top nozzle for a pressurized water nuclear reactor, the top nozzle comprising:
a plate portion having a peripheral portion;
a hub portion spaced from the plate portion;
a plurality of support portions extending from the plate portion to the hub portion; and
at least one deflector portion spaced from the hub portion and extending inwardly from the peripheral portion at an acute angle with respect to the plate portion,
wherein the plate portion further has a plurality of ribs disposed internal with respect to the peripheral portion; and wherein the top nozzle further comprises at least one deflector support portion extending from a corresponding one of the plurality of ribs to the at least one deflector portion.

12. The top nozzle of claim 1 wherein the at least one deflector portion comprises a distal portion; and wherein, when viewed from a top plan view, the distal portion is disposed between the peripheral portion and the hub portion.

13. A pressurized water nuclear reactor comprising:
a pressure vessel;
a plurality of fuel assemblies housed by the pressure vessel, each fuel assembly comprising:
a bottom nozzle, and
a top nozzle comprising:
a horizontal plate portion having a peripheral portion,
a hub portion spaced from the plate portion,
a plurality of support portions extending from the plate portion to the hub portion, and
at least one deflector portion extending continuously inwardly and upwardly from the peripheral portion at an acute angle with respect to the plate portion; and
a plurality of fuel rods disposed intermediate the top nozzle and the bottom nozzle,
wherein the at least one deflector portion is spaced from each of the hub portion and the plurality of support portions, and is cantilevered from the peripheral portion,
wherein the top nozzle is made of a single piece of material, and
wherein, when the top nozzle is viewed from a top plan view, the at least one deflector portion is substantially triangular shaped.

14. The pressurized water nuclear reactor of claim 13 wherein the peripheral portion comprises a plurality of corner portions and a plurality of edge portions; wherein each of the plurality of edge portions extends between a corresponding pair of the plurality of corner portions; wherein each of the plurality of edge portions has a midpoint; wherein the at least one deflector portion comprises a plurality of deflector portions each extending radially inwardly from a corresponding midpoint of a corresponding one of the plurality of edge portions; wherein each of the plurality of support portions extends from a corresponding one of the plurality of corner portions; and wherein each of the plurality of deflector portions is spaced from each of the plurality of corner portions.

15. The pressurized water nuclear reactor of claim 13 wherein the plate portion is hexagonal-shaped; wherein the peripheral portion comprises six edge portions; and wherein the at least one deflector portion comprises six deflector portions each extending from a corresponding one of the six edge portions.

16. The pressurized water nuclear reactor of claim 13 wherein the at least one deflector portion comprises a base portion and an extension portion; wherein the base portion extends inwardly from the peripheral portion at the acute angle; and wherein the extension portion extends inwardly from the base portion at a second angle between 150 degrees and 170 degrees with respect to the base portion.

17. The pressurized water nuclear reactor of claim 13 wherein the at least one deflector portion has a distal portion disposed opposite and distal the peripheral portion; and wherein the at least one deflector portion narrows from the peripheral portion to the distal portion.

18. The top nozzle of claim 11 wherein the at least one deflector portion comprises a first deflector portion, a second deflector portion disposed opposite and distal the first deflector portion, a third deflector portion, a fourth deflector portion disposed opposite and distal the third deflector portion, a fifth deflector portion, and a sixth deflector portion disposed opposite and distal the fifth deflector portion; wherein the first deflector portion and the second deflector portion each have a center line; wherein the third deflector portion, the fourth deflector portion, the fifth deflector portion, and the sixth deflector portion each have a first half portion, a second half portion, and a center line separating the first half portion and the second half portion; wherein the at least one deflector support portion comprises ten additional support portions; wherein two of the ten deflector support portions each coincide with a corresponding center line of a corresponding one of the first deflector portion and the second deflector portion; wherein four of the deflector support portions each extend from a corresponding first half portion of a corresponding one of the third deflector portion, the fourth deflector portion, the fifth deflector portion, and the sixth deflector portion; and wherein another four of the deflector support portions each extend from a corresponding second half portion of a corresponding one of the third deflector portion, the fourth deflector portion, the fifth deflector portion, and the sixth deflector portion.

19. The top nozzle of claim 11 wherein the at least one deflector portion comprises a first deflector portion having a first half portion, a second half portion, and a center line separating the first half portion and the second half portion; and wherein the at least one deflector support portion comprises a first deflector support portion extending from the first half portion and a second deflector support portion extending from the second half portion.

20. The top nozzle of claim 11 wherein the at least one deflector portion comprises a first deflector portion having a center line; and wherein the at least one deflector support portion comprises a first deflector support portion coinciding with the center line.

* * * * *